United States Patent

Matsushima et al.

[11] 4,418,161
[45] Nov. 29, 1983

[54] RESIN COATED SAND AND METHOD FOR PRODUCING SAME

[75] Inventors: Noriaki Matsushima; Yukio Saeki; Yukio Tokunaga, all of Fujieda, Japan

[73] Assignee: Sumitomo Durez Company, Ltd., Tokyo, Japan

[21] Appl. No.: 410,117

[22] Filed: Aug. 20, 1982

[30] Foreign Application Priority Data

Feb. 9, 1981 [JP] Japan .................. 56-136953

[51] Int. Cl.³ .............................. C08K 3/36
[52] U.S. Cl. .................. 523/145; 428/404
[58] Field of Search ........... 523/127, 145; 428/404

[56] References Cited

U.S. PATENT DOCUMENTS 4,196,114  4/1980  Funabiki et al. ............ 523/145
4,252,700  2/1981  Funabiki et al. ............ 523/145
4,345,003  8/1982  Matsushima et al. ........ 523/145

FOREIGN PATENT DOCUMENTS 47-41645  10/1972  Japan ...................... 523/145

Primary Examiner—Lewis T. Jacobs
Attorney, Agent, or Firm—James F. Tao; James F. Mudd

[57] ABSTRACT

This invention relates to a method for the production of an improved resin coated lubricated sand for use in shell molding processes, wherein the resin coated sand is especially useful in casting operations using aluminum, magnesium and their alloys.

The sand is coated with a phenolic type resin containing a lubricant and an additive to assist in the thermal decompositions of the binder to provide a more efficient removal of the sand grains. The additive is an organic bromide compound of the type:

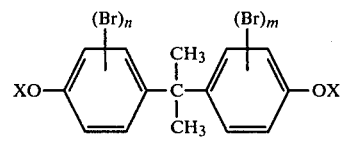

wherein:
n and m are integers 0, 1 or 2, and n and m cannot be 0 at the same time.
$B_r$ position is ortho to —ox
x is selected from: —H, —$C_2H_4OH$, —$CH_2$—CH=$CH_2$ and —$CH_2$—CH BR—$CH_2$BR.

17 Claims, 1 Drawing Figure

RESIN COATED SAND AND METHOD FOR PRODUCING SAME

BACKGROUND OF THE INVENTION

The present invention relates to an improved resin coated sand to be used in a shell-molding process. In conventional sand molding operations, a mixture of sand coated with binder are placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sand-binder mixture causing the binder to be destroyed to a degree that allows the sand to be removed from the cast metal in an efficient manner.

In the automobile industry, the trend of maufacturers has led to the replacement of iron and steel casings with lighter weight metals such as aluminum, magnesium and their alloys. These castings are produced by sand-molding processes, but occur at lower temperatures than iron castings. The use of conventional binders, at these lower temperatures, have created problems in the removal of the sand particles from the castings due to the failure of the binder to be decomposed.

It has been discovered that the use of organic bromide compounds incorporated in the binder composition will alleviate the problem of particulate removal from the casting, at the lower temperatures of aluminum and magnesium castings. The removal of the sand from complicated mold structures is accomplished by agitation or flogging of the casting after the cooling cycle. Flogging is a term used to indicate a tapping or impact force applied to the castings to remove the particulate sand particles leaving a clean cast structure.

After the flogging operation the sand can be reprocessed for reuse in subsequent shell molding operations. The use of this improved binder formulation, allows this reclaimed sand to be utilized in an efficient manner.

SUMMARY OF THE INVENTION

This invention relates to a resin coated sand for shell-molding process suitable for casting metals having a lower melting temperature such as aluminum and magnesium compared with iron.

Recently, cast parts of automobiles have been made of light metals instead of iron, such as aluminum and magnesium having a lower melting temperature, so as to save weight. Casting light metals will be more and more popular for said purpose. On the other hand for economizing the use of sand, reclaimed sand from shell-mold made of resin coated sand is reused in the foundry so as to lower the consumption of sand.

In the case of iron casting, the stock temperature of the shell-mold reaches 800°-1000° C. at pouring, and the strength of the shell-mold is naturally reduced after casting because almost all the phenolic resin binder thereof is subjected to thermal degradation by the intense heat at pouring. Accordingly it is easy to remove the mold-core from molded articles in the form of sand grains after casting. For metals having a lower melting temperature, such as aluminum and magnesium, said stock temperature of the shell-mold at pouring is rather low, 300°-400° C. in general. This results in an incomplete thermal degradation of phenolic resin binder used therewith. Since conventional shell-molds have retained sufficient strength after casting for this reason, there have been extreme difficulties particularly for complicated mold structures, in removing core efficiently from molded articles. In these cases, flogging is required so as to crush the molds even after time-consuming calcination thereof in a furnace to remove the occluded core therefrom. This lower productivity as well as energy-saving in mass-production of cast aluminum or magnesium articles.

After much investigation to improve the shake-out property of shell-molds after casting metals having a lower melting temperature, such as aluminum, the inventors have found that the shake-out property of cast shell-molds is improved by using a resin coated sand produced by coating foundry sand with a lubricant-containing phenolic resin binder which also contains one or more of aromatic bromides represented by the following formula:

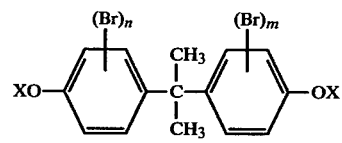

where,

Br positions are ortho to xo— m, n, are integers selected from 0, 1 and 2, but not zero at the same time, and X is selected from —H, —CH$_2$—OH, —CH$_2$—CH=CH$_2$, and —CH$_2$CHBr.CH$_2$Br.

DETAILED DESCRIPTION OF THE INVENTION

Figure 1:
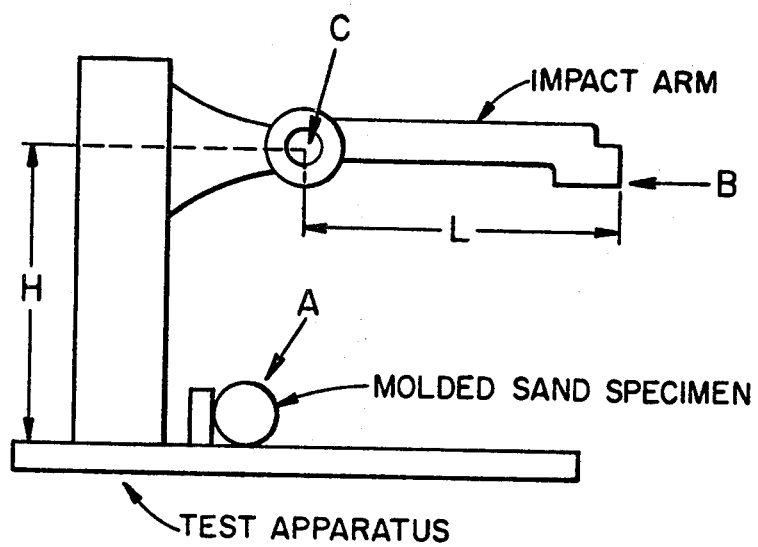
FIG. 1 is a side view of the test device used to determine shake-out properties of coated sand.

In order to improve the shake-out property after casting metals having a low melting temperature such as aluminum, the chemical crosslinking structure of cured phenolic resin binders must be thermally degraded and disintegrated at a relatively lower temperature range of 300°-400° C. In ordinary phenolic resins, whether they be of the novolac type or the resole type resins, said chemical crosslinking structure therein consists usually of methylene, methine and dimethylene-ether groups. Among them, the dimethylene-ether group changes by heat to a methylene group. On the other hand, both the methylene and methine groups are stable to thermal decomposition, so they require more energy for decomposition. Both the methylene and methine groups gradually begin to decompose at about 250° C., however, a higher temperature range of 600°-1000° C. is necessary for rapid decomposition of the main portion thereof. The thermal decomposition of phenolic resins is believed to be a thermal oxidation process whether exposed to either an oxidative or an inert atmosphere. In an inert atmosphere, it is thought that much of the oxygen contained therein contributes to the initiation of oxidation. It is further thought that both the methylene and methine groups change to hydroperoxides due to said thermal oxidation, and finally yield carboxylic acids through decomposition of dihydrobenzophenone. Accordingly, adding a compound, having a catalytic effect of reducing the activation energy of oxidation and/or thermal decomposition of methylene and methine groups, in phenolic resins appears to be an effective method for causing a thermal decomposition of said phenolic resins in a lower temperature range of 300°-400° C. The additives suitable for the purpose will be oxidants, peroxides and halogenated substances. Among halogenated substances, both chlorides and bromides are effective, however, the former emits gas with an unpleasant odor at decomposition thereof, and the said gas is toxic. Among the bromides, aromatics which are compatible with phenolic resins and which do not reduce the initial strength of shell-molds by their incorporation are suitable. Above all, the inventors hereof have found that compounds with the chemical structure given by the following formula accelerates the shake-out property extremely well when compared with other aromatic bromides:

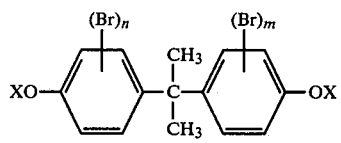

where,
Br positions are otho to XO—
m, n are integers selected from 0, 1 and 2, but not zero at the same time.
X is selected from —H, —CH$_2$—OH, —CH$_2$—CH=CH$_2$, and —CH$_2$CHBr.CH$_2$Br. and preferably of the structure:

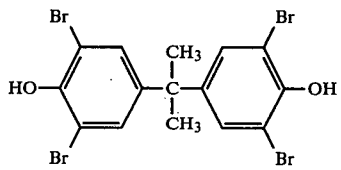

The inventors hereof have found that the presence of said aromatic bromide when coating foundry sand with lubricant-containing phenolic resins further accelerates the shake-out property of shell-molds without lowering the initial strength thereof, more than when added to a coating resin with no lubricant. The reason for this may be a synergism that lubricants in phenolic resins accelerate the thermal decomposition reaction of said phenolic resins in the presence of said aromatic bromides. The mechanism of said synergism is considered as follows: lubricants in phenolic resins enable aromatic bromides to disperse uniformly into said phenolic resins and thus said aromatic bromides enable phenolic resins to undergo a uniform thermal degradation, which as a whole results in accelerating said thermal decomposition reaction.

The phenolic resins used in the present invention are any of the novolac type, the resole type, or a mixture thereof. Phenol for preparing said phenolic resins may contain cresol, xylenol, resorcin, cathecol, hydroquinone, aniline, urea, melamine, cashew nut shell oil, etc. Formaldehyde for preparing said phenolic resins is selected from formalin, paraformaldehyde, trioxane, etc. Catalysts for the reaction of phenol and formaldehyde are acidic substances generally such as oxalic, hydrochloric and sulfuric acid for novolac type resin preparation, and basic substances generally selected from such as ammonia, triethylamine, sodium hydroxide, and barium hydroxide for resole type resin preparation. Lubricants usable according to the present invention are ordinary ones, however, preferable are ethylene bis-stearic amide, methylene bis-stearic amide, oxystearic amide stearic amide and methylol stearic amide. Lubricant-containing phenolic resins can be obtained by adding said lubricant to phenolic resins at any stage of their preparation; prior to, during or after the reaction.

Methods for producing resin coated sand in the present invention may be any of the commercial hot-coating, semi-hot-coating, cold-coating, and powder-solvent coating, however, hot-coating is preferably recommended for the present invention.

The proper time for adding said aromatic bromides during the process of coating sand, is optional, prior to, during or after addition of a lubricant-containing phenolic resin thereto. Said aromatic bromides are added as they are in solid form, or as a solution.

The shake-out property of shell molds are remarkably enhanced by said synergism of aromatic bromides with the lubricant contained therein in any of these cases.

The aromatic bromide is added to a lubricant-containing phenolic resin in the ratio of 0.1-50 to 100 parts by weight of the resin; when the ratio is less than 0.1 parts by weight, it is difficult to obtain an excellent shake-out property because the cleavage reaction of methylene and methine bonds is insufficient, and when the ratio is more than 50 parts by weight, it impairs the initial strength of shell-molds although an excellent shake-out property may be obtained. From the standpoint of workability of mold-making from resin coated sand and the retention of initial strength of the shell-mold prepared therefrom, the most preferable ratio of aromatic bromides to a lubricant-containing phenolic resin is 20-30 to 100 parts by weight.

The inventors hereof will explain the present invention by the following nonlimitative Examples and Comparative Examples, wherein "parts" and "percent" indicate "parts by weight" and "percent by weight," respectively.

PREPARATION EXAMPLE 1

Novalac Phenolic resin *with* lubricant

In a kettle fitted with a reflux cooler, 1000 parts of phenol, 650 parts of 37% formalin and 10 parts of oxalic acid were added. The temperature of the kettle was gradually elevated, and when it reached 96° C., after 120 minutes' reflux, 10 parts of methylene bis-stearic amide were added. After mixing, the reaction mixture was dehydrated to obtain 970 parts of a lubricant-containing novolac type phenolic resin having a melting point of 80° C., and a free phenol content of 5.5 percent.

PREPARATION EXAMPLE 2

Novalac Phenolic resin *without* lubricant

In a kettle fitted with a reflux cooler, 1000 parts of phenol, 650 parts of 37% formalin and 10 parts of oxalic acid were added. The temperature of the mixture was gradually elevated. When it reached 96° C., after 120 minutes' reflux, it was dehydrated to obtain 960 parts of a novolac type phenolic resin having a melting point 75° C. and a free phenolic content of 5.4 percent.

EXAMPLE 7000 parts of Sanei silica sand, preheated to 130°-140° C., was charged into a whirl-mixer. After adding 140 parts of lubricant-containing novolac type phenolic resin obtained from Preparation Example 1, 13 parts of Compound I was added. Mixing continued for an additional 40 seconds.

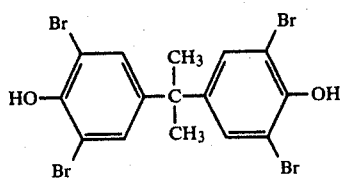

Compound I 2,2'-bis(4-hydroxy-3, 5-dibromophenyl) propane

An aqueous hexamethylene tetramine solution compring 21 parts of hexamethylene and 105 parts of water, was added thereto and the mixing continued until the coated sand crumbled. 7 parts of calcium stearate was added thereto, followed by additional mixing. The mixture was discharged and aerated to obtain coated sand. This procedure was repeated three additional times, with the addition of compounds II, III, and IV to obtain 4 samples of coated sand:

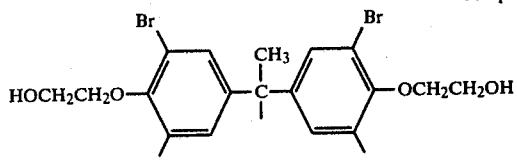

Compound II 2, 2'-bis(4-hydroxyetoxy-3, 5-dibromophenyl) propane

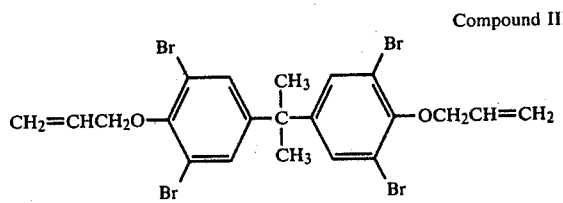

Compound III 2,2'-bis(4-allylether-3, 5-dibromophenyl) propane

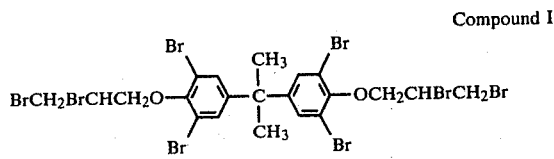

Compound IV 2,2-bis[4(2, 3-dibromo) propoxy-3, 5-dibromophenyl] propane

COMPARATIVE EXAMPLE 1

The procedure of Example 1 was followed with the same conditions and amounts substituting the following compounds for the aromatic bromides:

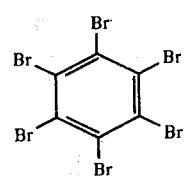

Compound V

Hexabromobenzene

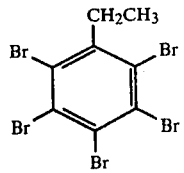

Compound VI 2,3,4,5,6-heptabromoethylbenzene

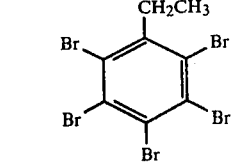

Compound VII

Decabromodiphenylether

COMPARATIVE EXAMPLE 2

The procedure of Example 1 was followed except the phenolic resin prepared in Preparation Example 2 was employed. Also, Comparative example 1 was duplicated, again with the substitution of the resin prepared in Preparation Example 2. Therefore, these 7 samples of resin coated sand were prepared using a novalac phenolic resin without lubricant.

COMPARATIVE EXAMPLE 3

The procedure of Example 1 was repeated with the omission of the aromatic bromide component to produce a resin coated sand.

COMPARATIVE EXAMPLE 4

The procedure of Comparative Example 2 was repeated with the omission of the aromatic bromide component to produce a resin coated sand.

The characteristics of the resin coated sands obtained in Example 1, Comparative Examples 1, 2, 3, and 4 are indicated in Table 1.

Test Methods:
  Bending strength: according to JACT Method SM-1
  Stick point: according to JACT Method C-1
  Tensile strength under elevated temperature: according to JACT Method SM-10
  Shake-out property:
  Preparation of specimen:
    Coated sand is fed into an iron pipe of 29 mm in diameter and 150 mm in length. After 30 minutes baking, it is covered with aluminum foil and further heated for 3 hours at 370° C. After cooling, the sand molded pipe was removed.
  Test method:
    The specimen is hit by the impact arm of the apparatus illustrated in FIG. 1. Crumbled sand is removed from the pipe after each flogging. Weighing the residual molded sand of the specimen until it becomes zero, the shake-out property is defined by the number of floggings required.
  Test apparatus:
    In FIG. 1, A is a molded sand specimen and B is the arm which revolves around pivot C, 30 cm (H) above A. Said arm is at first set horizontally, and then allowed to drop so as to flog said specimen.

TABLE 1

| Lubricant in resin | | | Example 1 yes | | | | | | | Comparative Examples | | | | | | | | | |
|---|---|---|---|---|---|---|---|---|---|---|---|---|---|---|---|---|---|---|---|
| | | | | | | | | | 1 yes | | | 2 no | | | | | | | 3 no | 4 no |
| Aromatic bromide | | | I | II | III | IV | V | VI | VII | I | II | III | IV | V | VI | VII | — | — |
| Coated sand | Stick point (°C.) | | 102 | 100 | 101 | 99 | 104 | 100 | 101 | 103 | 102 | 101 | 102 | 104 | 101 | 104 | 99 | 101 |
| Shell-mold | Bending strength (Kg/cm²) | | 44.9 | 44.6 | 44.1 | 44.2 | 32.5 | 28.4 | 27.5 | 40.1 | 40.8 | 40.3 | 40.4 | 31.9 | 27.8 | 27.0 | 37.5 | 30.5 |
| | Tensile strength under heat (Kg/cm²) at 250° C. | 30 sec | 3.0 | 3.0 | 2.9 | 2.7 | 2.4 | 2.5 | 2.9 | 2.8 | 2.8 | 2.8 | 2.4 | 2.3 | 2.4 | 2.4 | 2.7 | 2.4 |
| | | 45 sec | 6.2 | 5.9 | 5.9 | 5.5 | 5.0 | 5.5 | 5.2 | 6.0 | 5.4 | 5.7 | 5.0 | 5.0 | 4.8 | 5.0 | 5.3 | 5.0 |
| | | 60 sec | 10.0 | 9.8 | 10.0 | 9.3 | 7.9 | 10.0 | 9.4 | 9.4 | 8.9 | 9.2 | 8.0 | 7.9 | 7.9 | 8.0 | 8.3 | 8.3 |
| | Shake-out property (times) | | 10 | 12 | 14 | 12 | 22 | 25 | 22 | 20 | 24 | 25 | 22 | 29 | 30 | 29 | 33 | 31 |

PREPARATION EXAMPLE 3

Resole Phenolic Resin with lubricant

In a kettle fitted with a reflux cooler, 1000 parts of phenol, 1795 parts of 37% formalin, 160 parts of 28% aqueous ammonia and 60 parts of 50% sodium hydroxide solution were added. The temperature of the mixture was gradually elevated. When the temperature reached 96° C., after 30 minutes' reflux, 40 parts of ethylene bis-stearic amide was added. After dehydrating the mixture under vacuum until the temperature reached 85° C., it was dumped from the kettle, cooled rapidly, and successively ground to obtain 1100 parts of a coarse ground resole type phenolic resin.

EXAMPLE 2

7000 parts of Sanei silica sand preheated at 130°–140° C. was charged to a whirl-mixer. Aromatic bromide I, 0.07 parts was added thereto, and the mixture was mixed for 20 seconds. 140 parts of lubricant-containing resole type phenolic resin obtained from Preparation Example 3 was added, mixing for 30 minutes. Then 105 parts of cooling water were added. The mixture was mixed until the coated sand crumbled. 7 parts of calcium stearate was added thereto, through 30 seconds' mixing, and the mixture was discharged and aerated to obtain a coated sand. This experiment was repeated two additional times, adding 7 parts and 42 parts of the aromatic bromide respectively. Thus, three types of coated sand were obtained.

EXAMPLE 3

Example 2 was repeated except 28 parts of aromatic bromide II was employed as the bromide.

COMPARATIVE EXAMPLE 4

A resin coated sand was produced by the procedure of Example 2 except *no* aromatic bromide was added.

Respective characteristics, including the shake-out property of shell-molds of the resin coated sands obtained by Example 2, 3, and Comparative Example 4 are indicated in Table 2.

TABLE 2

| | Example | | | Comparative |
|---|---|---|---|---|
| | 2 | | 3 | Example 4 |
| Aromatic bromide | I | I | II | — |
| Ratio of aromatic bromide to resin (%) | 0.05 | 5.0 | 30 | 20 | — |
| Coated Stick point sand (°C.) | 96 | 97 | 100 | 98 | 96 |
| Shell-mold Bending Strength (Kg/cm²) | 35.4 | 37.8 | 32.5 | 36.5 | 30.5 |
| Tensile strength under heat (Kg/cm²) at 250° C. | 30 sec 2.4 | 2.6 | 2.2 | 2.2 | 2.3 |
| | 45 sec 5.0 | 5.8 | 4.6 | 5.1 | 4.8 |
| | 60 sec 7.5 | 8.0 | 7.6 | 7.4 | 7.6 |
| Shake-out property (times) | 20 | 13 | 6 | 9 | 28 |

The test procedures used herein are the same as reported for Table 1.

We claim:

1. A resin coated foundry sand with improved shake-out properties which comprises foundry sand coated with a lubricant-containing phenolic resin and one or more aromatic bromides of the following formula:

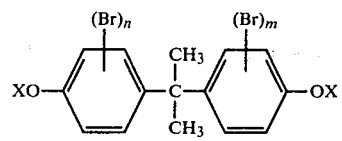

wherein:
Br positions are ortho to XO—;
m and n are integers selected from 0, 1 and 2, but not zero at the same time and,
x is selected from —H, —CH$_2$—CH$_2$—OH, —CH$_2$—CH=CH$_2$, and —CH$_2$CHBrCH$_2$B.

2. A resin coated sand according to claim 1, wherein said aromatic bromide is represented by the following formula:

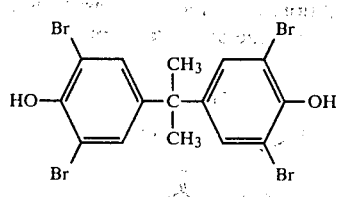

3. A resin coated sand according to claim 1 or 2, wherein the ratio of aromatic bromide to a lubricant-containing phenolic resin is 0.1–50 to 100 parts by weight.

4. A resin coated sand according to claim 3, wherein the ratio of aromatic bromide to lubricant-containing phenolic resin is 20–30 to 100 parts by weight.

5. Resin coated sand according to claim 1, wherein said lubricant containing phenolic resin is a novolac type.

6. Resin coated sand according to claim 1, wherein said lubricant-containing phenolic resin is a resole type.

7. Resin coated sand according to claim 1, wherein said lubricant-containing phenolic resin is a mixture of a novolac type and a resole type.

8. Resin coated said according to claim 1, wherein said lubricants contained in phenolic resin are ethylene bis-stearic amide, methylene bis-stearic amide, oxy stearic amide, stearic amide and methylol stearic amide.

9. A process for producing resin coated sand having improved shake-out property comprises the coating of foundry sand with a lubricant-containing phenolic resin and one or more aromatic bromides of the following formula:

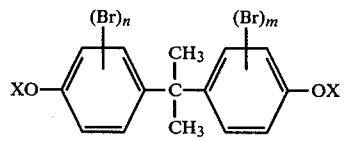

wherein:
Br positions are ortho to XO—,
m and n are integers selected from 0, 1 and 2, but not zero at the same time and,
X is selected from —H, —CH$_2$—CH$_2$—OH, —CH$_2$—CH=CH$_2$, and —CH$_2$CHBr.CH$_2$Br.

10. A method for producing a resin coated sand according to claim 9, wherein said aromatic bromide is represented by the following formula:

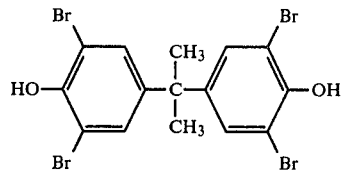

11. A method for producing a resin coated sand according to claim 9 or 10 wherein the ratio of aromatic bromide to a lubricant-containing phenolic resin is 0.1–50 to 100 parts by weight.

12. A method for producing a resin coated sand according to claim 11 wherein the ratio of aromatic bromide to a lubricant-containing phenolic resin is 20–30 to 100 parts by weight.

13. A method for producing resin coated sand according to claim 9, wherein said lubricant-containing phenolic resin is a novolac type.

14. A method for producing resin coated sand according to claim 9, wherein said lubricant-containing phenolic resin is a resole type.

15. A method for producing resin coated sand according to claim 9, wherein said lubricant-containing phenolic resin is a mixture of novolac type and resole type.

16. A method for producing resin coated sand according to claim 9, wherein said lubricant contained in phenolic resin is ethylene bis-stearic amide, methylene bis-stearic amide, oxy stearic amide, stearic amide and methylol stearic amide.

17. A resin coated foundry sand with improved shake out properties comprising foundry sand coated with a lubricant-containing phenolic resin and an aromatic bromide of the formula:

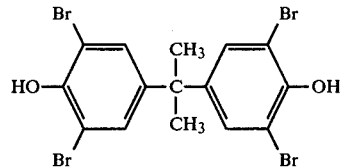

wherein the ratio of aromatic bromide to lubricant-containing phenolic resin is 20–30 to 100 parts by weight.

* * * * *